(No Model.) 4 Sheets—Sheet 1.
H. H. DILLE & E. W. McGUIRE.
LAWN MOWER.

No. 446,329. Patented Feb. 10, 1891.

(No Model.) 4 Sheets—Sheet 3.

H. H. DILLE & E. W. McGUIRE.
LAWN MOWER.

No. 446,329. Patented Feb. 10, 1891.

Witnesses
Chas. J. Williamson.
Henry C. Hazard.

Inventor
H. H. Dille and E. W. McGuire
by Prindle and Russell
their attorneys (No Model.) 4 Sheets—Sheet 4.

H. H. DILLE & E. W. McGUIRE.
LAWN MOWER.

No. 446,329. Patented Feb. 10, 1891.

Witnesses
Chas. J. Williamson
Henry C. Hazard

Inventor
H. H. Dille and E. W. McGuire
by Prindle and Russell
their Attorneys

UNITED STATES PATENT OFFICE.

HENRY H. DILLE AND ELWOOD W. McGUIRE, OF RICHMOND, INDIANA, ASSIGNORS TO THE DILLE & McGUIRE MANUFACTURING COMPANY, OF SAME PLACE.

LAWN-MOWER.

SPECIFICATION forming part of Letters Patent No. 446,329, dated February 10, 1891.

Application filed February 20, 1888. Serial No. 264,554. (No model.)

*To all whom it may concern:*

Be it known that we, HENRY H. DILLE and ELWOOD W. McGUIRE, of Richmond, in the county of Wayne, and in the State of Indiana, have invented certain new and useful Improvements in Lawn-Mowers; and we do hereby declare that the following is a full, clear, and exact description thereof, reference being had to the accompanying drawings, in which—

Figure 1:
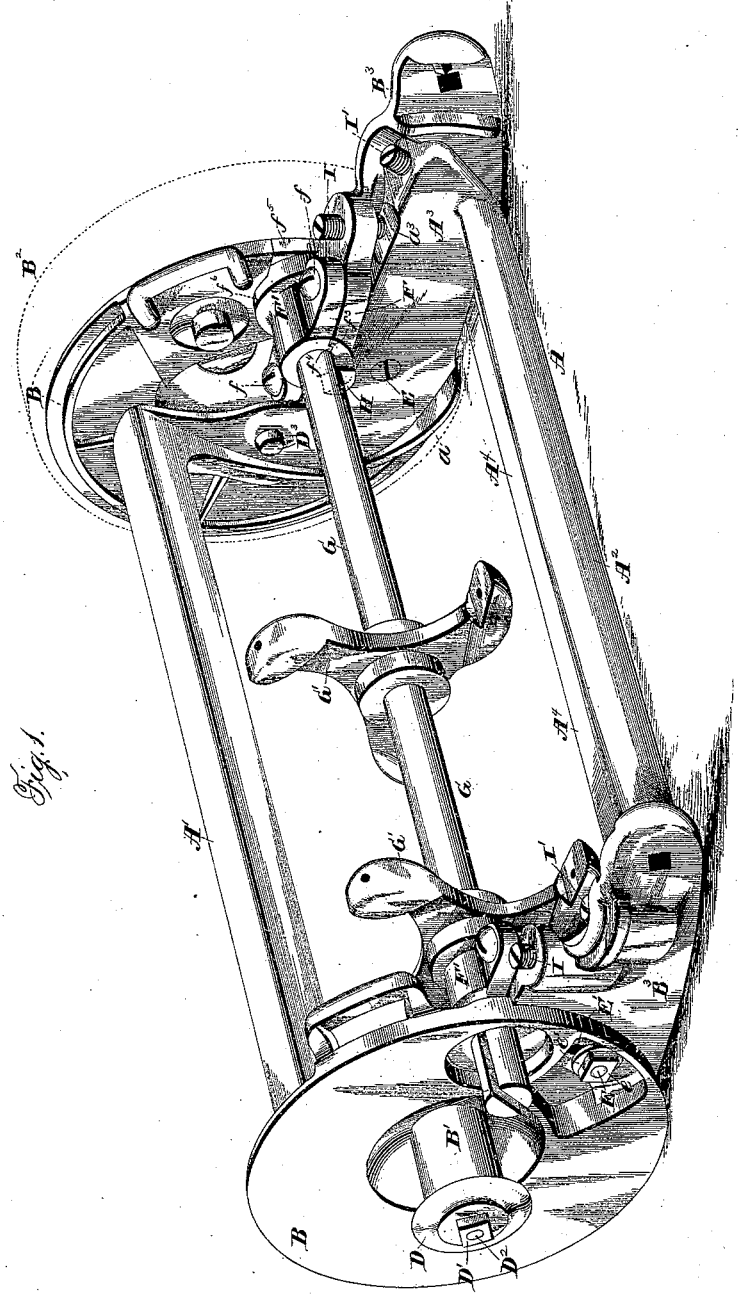
Figure 2:
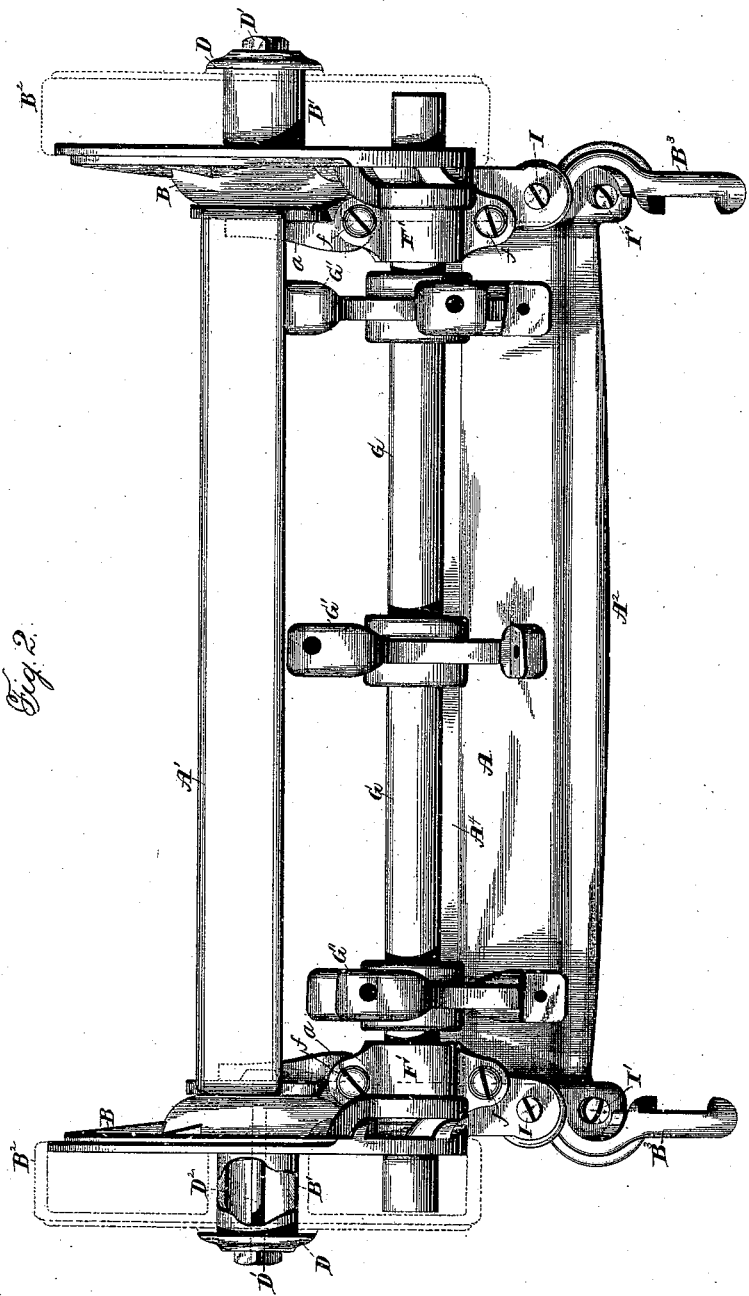
Figure 3:
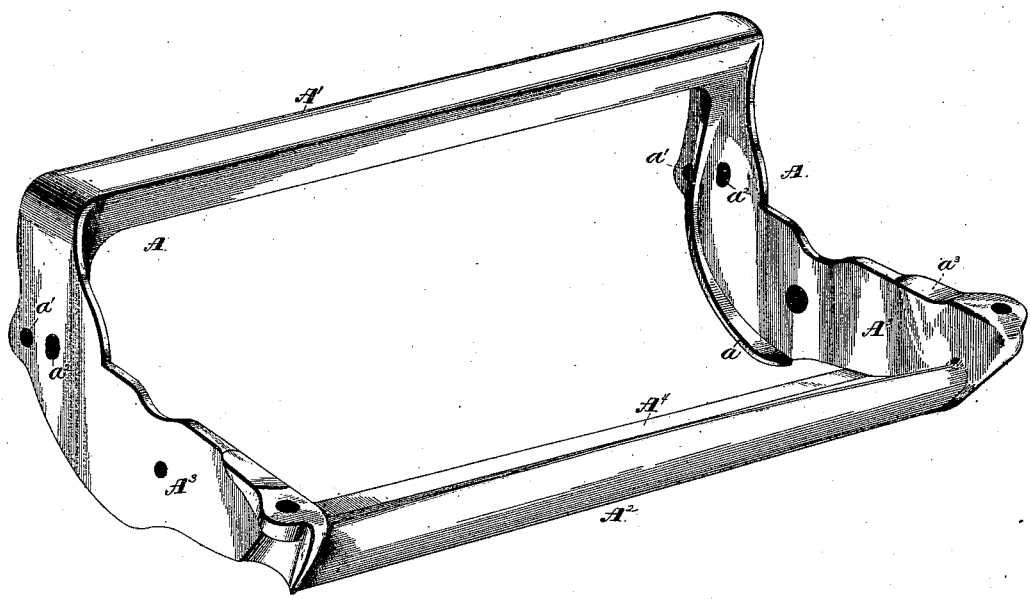
Figure 4:
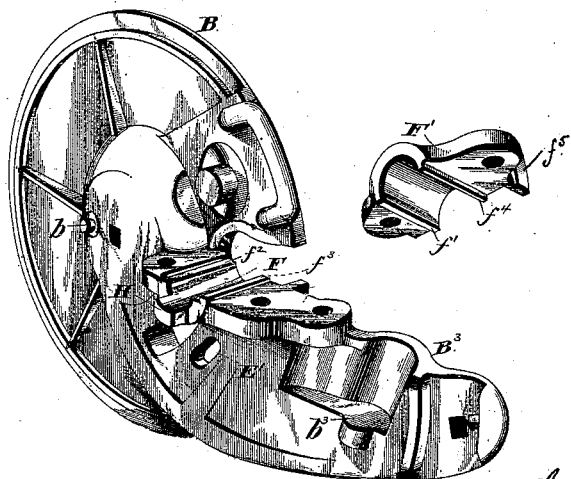
Figure 5:
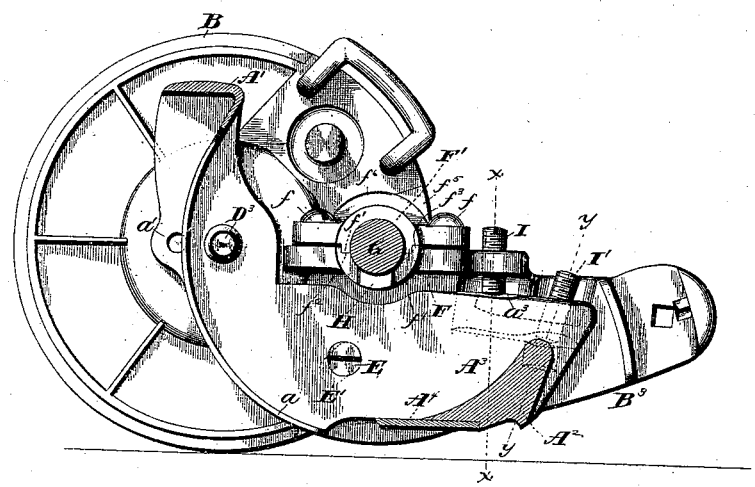
Figure 6:
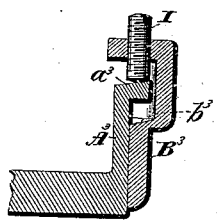
Figure 7:
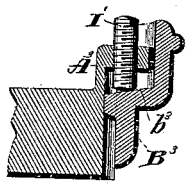

Figure 1 shows a rear perspective view of our mower with the driving-wheels and the revolving cutter-blades removed; Fig. 2, a plan view of the same; Fig. 3, a detail perspective view of the main cutter-carrying frame; Fig. 4, a similar view of one of the side plates removed; Fig. 5, a detail view of one of the side plates in side elevation; Fig. 6, a detail view of a section on line $xx$ of Fig. 5, and Fig. 7 a similar view of a section on line $yy$ of Fig. 5.

Letters of like name and kind refer to like parts in each of the figures.

The object of our invention is to provide an improved lawn-mower; and to this end our invention consists in the construction, arrangement, and combination of the parts of the lawn-mower, as hereinafter specified and claimed.

In the drawings, A designates the frame, which in our mower serves to firmly connect the side plates B B in the manner and by the means to be hereinafter described. The frame A, as shown, is in one piece and is rectangular in general form. It consists of the elevated front bar A', the low rear bar $A^2$, parallel to bar A', and the two parallel side bars $A^3 A^3$, having their corresponding ends connected by the front and rear bars, respectively. The side bars do not extend in straight lines from the rear to the front frame-bar; but from the rear bar they first extend forward, so as to pass under the revolving cutter-shaft when the machine is put together, and then turn upward to the elevated frame-bar A'.

To the low rear frame-bar $A^2$ is fixed the cutter $A^4$, against which the revolving cutter-blades are to cut. As shown, this cutter is attached to the lower side of the bar and projects forward beyond its front edge; but we do not limit ourselves to this precise location of the cutter on the bar or to any particular means of fastening it in place.

On the inner side of each of the side bars $A^3$ of the frame A is an inwardly-projecting rib or flange $a$, curved so as to clear the cutter-blades of the revolving cutter. This flange, projecting inward in front of the ends of the cutter-blades, serves, as will be understood, as a guard to prevent any grass coming close to the inner sides of the side bars of the frame escaping the cutting-edges by passing between the ends of the cutter-blades and the side bars. Each side bar $A^3$ of the frame A is, near its upper and forward end, pivoted upon a stud or pin $b$ on the inner side of the respective side plate B, said stud or pin entering a hole or bearing $a'$ in the side bar $A^3$. Any movement or adjustment of the frame and side plates with reference to each other is then around these pivot-studs.

Each of the side plates B has the main disk-shaped portion adapted to fit and close the inner side of a cup-shaped supporting and driving wheel $B^2$. (Shown in dotted lines in Figs. 1 and 2.) Projecting outward from the center of the disk portion of each side plate B is the hollow stud B', upon which the drive-wheel is to be journaled.

As indicated in the drawings, each drive-wheel is journaled and held upon its respective stud B' in the same manner and by the same means as the drive-wheel in our lawn-mower shown and described in our United States Patent No. 323,285. A washer D is held against the outer side of the wheel by a nut D' on the bolt $D^2$, which passes in through the hollow stud or hub and the side plate and has a head $D^3$ on its inner end. Instead, however, of only passing through the side plate B and having its head $D^3$ engaging the inner side of the plate, as shown and described in our patent referred to, the bolt $D^2$ in the present machine passes also through a hole $a^2$ in the side bar $A^3$ of frame A and with its head $D^3$ engages the inner face of such side bar. A tightening up of the nut D' will then not only cause the drive-wheel to be held firmly in place on its journal-stud by washer D, but will also draw the side bar $A^3$ of frame A tightly and firmly against the side plate B. When the nuts on the bolts at both sides of the machine are thus tightened up, the frame A will be firmly clamped to the side plates B B.

The holes $a^2$ $a^2$ in the side bars $A^3$ $A^3$ are made larger than the bolts $D^2$ $D^2$ in order to allow some play for the relative adjustment of the frame A and side plates B B on the pivot-studs $b\ b$, as described hereinbefore. The side bars $A^3$ $A^3$ are further held firmly to and against the side plates B B by bolts E E, extending from them through the slots E' E' in said side plates and provided on their outer ends with nuts $e\ e$ and washers $e'\ e'$, the latter being forced by the nuts to bear against the portions of the side plates adjacent to the slots E' E'. With the bolts $D^2$ $D^2$ and E E tightened up the side plates B B and frame A will, obviously, be very steadily and firmly secured together, so as to make a complete, strong, and rigid support for all the parts of the mower.

Upon the inner side of each side plate B and at or near the rear edge thereof is a half journal-bearing or journal-box F for the rotary cutter-shaft G. These half journal-boxes, which are shown as cast in one piece with the side plates, but can be made separately and attached thereto, as desired, are situated above and preferably a little to the front of the stationary cutter $A^4$ on the rear bar $A^2$ of frame A. The ends of the cutter-shaft project out through openings in the side plates and beyond the outer sides of the latter and are to be provided with suitable gearing to be driven from the driving-wheels as the latter rotate.

I have shown no connecting-gearing between the driving-wheels and the shafts, as no such gearing is claimed in this case. So far as the invention covered by the present application goes, any suitable driving-gearing can be used to actuate the cutter-shaft G. On said shaft are set the usual cutter-reel spiders G' G' G', to the arms of which the revolving cutter-blades are to be fastened in the usual and well-known way. I have left off these blades, so as to show the construction and arrangement of the machine and parts thereof more clearly.

Engaging the cutter-shaft and holding it down in the half journal-boxes F F are the upper half journal-boxes or journal-caps F' F', one for each bearing. Each of these half boxes or caps is held by two screws $f\ f$, passing through it in front and rear of the shaft and tapped into suitable projecting flanges or lugs on the side plate B. By means of these screws the upper half journal boxes or caps can be adjusted to take up wear of the shaft or journal bearings and can be set to bear upon the shaft, as desired.

To prevent any twisting of the upper half-boxes and consequent binding action on the shaft, which is apt to take place where a portion of a journal-box is made separate from the rest of the box and adjustable, we provide each cap or upper half-box F' with a rib $f'$ parallel to the shaft-receiving groove or cavity, adapted, when the half box or cap is in place, to project into and engage a rabbet $f^2$ in the lower half-box F on the forward side of the shaft-receiving groove or cavity therein. The rabbet $f^2$ and the rib $f'$ are along the edge of the shaft-receiving groove or cavity in the respective portions of the journal-box.

On the lower half journal-box F is an upwardly-projecting rib $f^3$ at a short distance to the rear of and parallel to the rear edge of the shaft-receiving groove or cavity, and on the upper half-box F' is the rib $f^4$, extending down between the rib $f^3$ on the lower half-box and the shaft-receiving concavity therein. With this construction the caps or upper half-boxes F' F' when in place will always be maintained with their shaft-receiving concavities or grooves extending exactly parallel to the shaft-receiving concavities or shaft-engaging grooves in the lower portions of the journal-boxes. The upper movable and adjustable half journal-boxes for the cutter-shaft will be kept parallel to said shaft and cannot be swung or twisted so as to bind on the latter. By screwing down both screws $f\ f$ the cap or upper half of the either journal-box can be forced down upon the cutter-shaft as tightly as desired. By loosening one screw and tightening the other the cap or half-box can be tilted as desired with either rib $f'$ or $f^3$ as a fulcrum. Such tilting is often necessary in adjusting or fitting the journal-boxes to the cutter-shaft, and with our journal-boxes as constructed can be done as desired without any danger of the upper half-boxes getting swung or twisted with their shaft-receiving grooves or cavities out of proper line.

We have shown and described the lower half journal-boxes as provided with the rabbet at the front side and the rib at the rear side of the shaft-receiving grooves or cavities; but this arrangement can, without departure from our invention, be reversed as desired, a corresponding reversal being made in the arrangement of the ribs on the upper half of the boxes.

As is well known to any one using a lawn-mower with a rotary cutter-shaft, grass is very apt to wind around the shaft close to its journal-bearings, so as to interfere with and often stop the rotation of the shaft. Grit and dirt also collect upon the shaft, especially when damp or wet grass is being cut, and, working against and into the shaft-bearings, not only interfere with the free action of the shaft but injure said bearings thereof. Where, as is usual in lawn-mowers, the end spiders of the cutter-reel are placed on the shaft with their hubs close to the shaft-bearings, the winding of grass and collecting of dirt and grit upon the shaft between such hubs and bearings are often very rapid and effectually stops the machine. To prevent such most injurious clogging of the cutter-shaft, we provide a lug or projection H, extending inward along the shaft from each journal-box or bearing forming a shaft-clearer. As shown in the drawings, such lugs project from the lower fixed halves of the journal-boxes and are cast thereon. We do not, however, limit ourselves to such construction or to such location of the shaft-clearers. They can be located at any desired points around the shaft and can consist of pins or studs attached to the journal-bearing or journal-box of the shaft or to the frame. However made or located they should, as shown in the drawings, not inclose or extend around the shaft, but only cover or be in contact with a small section of the periphery thereof. Where the end spiders of the cutter-reel are near the shaft-bearings the clearing-lugs should extend along the shaft to or against the spider-hubs. We have found by actual experience that the extension of the whole journal bearings or boxes out along the shaft and close against the reel-spider hubs will not prevent clogging of the shaft, for the grass and dirt will wind and work in between the hubs and bearing or journal box ends. On the other hand, we have found that if a space be left between the reel-spider hubs and the journal bearings or boxes, and a small lug, stud, or pin be provided extending between each bearing or box and the adjacent hub, grass cannot wind around the shaft, and the collection of clogging dirt will be prevented. We prefer to have the lug fit closely the small portion of the shaft periphery with which it is in contact—that is, we make it concave where it bears against the shaft. This concaving of the lug leaves an edge at the line of meeting of the concave and the forward side of the lug, which serves effectually to cut and remove from the shaft any grass that might tend to wind around the latter. Any dirt or grit getting in between the end of the lug and the reel-spider hub will be worked to the rear and out. With the small amount of surface presented by the end of the lug not enough grit or dirt can collect at any time to interfere with the rotation of the cutter-shaft.

For facilitating the putting in place and removal of the cutter-shaft G from its bearings the rearward side of the opening in one of the plates B through which the shaft end passes is removed, as shown in Fig. 4. The half journal box or cap F' for that end of the shaft is, as shown in Figs. 1 and 5, provided with a flange or block $f^5$ to take the place of such removed side when the half box or cap is in place. The upper half journal boxes or caps are both provided with a rib or flange $f^6$ to close effectually the shaft-opening in the plates B B above the lower half journal-boxes.

For adjusting the frame A about its pivots with reference to the side plates B B, so as to adjust the cutter $A^4$ to or from the revolving cutter-reel, we provide the rearward extension $B^3$ of each side plate with a set-screw I, bearing at its lower end against a bearing-surface $a^3$ on the respective side bar $A^3$ of frame A, and each side bar $A^3$ with another screw I', tapped down through a lug or ear on the bar and engaging the bearing-surface $b^3$ on the extension $B^3$ of the side plate. The bearing-surfaces $a^3$ and $b^3$ on the side-plate extension and the side bar $A^3$ are both inclined downward and inward, as shown. The result of such construction is that as the screws are tightened up the end of screw I, bearing on the inclined surface on the side bar $A^3$, will tend to force such bar outward or draw the side plate B inward against the said bar. The other screw I', bearing down upon the inclined surface $b^3$, tends to force the side-plate extension $B^3$ outward from the side bar $A^3$. The result of this opposing action of the screws I and I' on the two bearing-surfaces $a^3$ and $b^3$ obviously is to hold the side plate and extension thereof and the side bar $A^3$ most closely and firmly together.

The entire frame-work of our machine, including as it does the frame A and the side plates B B, with their extensions held and clamped together, as hereinbefore described and as shown in the drawings, is a strong, simple, compact, and rigid one, while being capable of being readily adjusted as desired or quickly taken apart and put together again.

With the frame A, carrying the cutter $A^4$, properly adjusted the machine can be taken to pieces, as for shipment, and put together again without necessity of any adjustment of the frame A again. If the screws I I be loosened and the screws I' I' be left as adjusted, the latter will not interfere at all with the taking apart of the frame A and the side plates.

When the side plates and frame A are to be put together again, as in assembling the parts of the machine, it will then only be necessary to screw down screws I I until they have bearing against the surfaces $a^3$ $a^3$ on the bars $A^3$ $A^3$. The screws I' I', which have not been moved, determine the position of the side bars $A^3$ $A^3$ and frame A and cutter $A^4$, and such position is that given by the original adjustment. Our machine can then be properly adjusted in the factory so as to do its best work, and when put together by the buyer is ready for use without any adjustment by him being necessary.

The elevated front bar A' of frame A serves not only to make frame A firm and rigid by rigidly connecting the forward ends of side bars $A^3$ $A^3$, but also as a guard for the revolving cutter-reel to prevent the revolving cutter-blades from striking a tree or object against which the machine may be run.

We contemplate, where it is found desirable, reversing the arrangement of adjusting-screws and inclined bearing-surfaces on the side plates B B and frame A.

Instead of screws I I being tapped down through portions of the side plates B B and bearing on inwardly-inclined surfaces on the side bars A³ A³, the screws could be tapped up through portions of the side bars and bear up against outwardly-inclined surfaces on the side plates B B. The arrangement shown in the drawings and described hereinbefore is, however, the one we prefer, while we do not consider the other any departure from our invention, as it involves merely a reversal of the parts.

The bolt D², passing through slots or enlarged holes a² a² in the side bars A³ A³, and the bolts E E, extending from the side bars through slots E' E' in the side plates, form clamping devices to clamp each side of the main frame to the respective side plates at two points.

It will be observed from the drawings and from the description hereinbefore given that the side plates are held together or in place by the one-piece frame and that neither the rotary cutter-shaft nor the handle have to be relied upon to act as part of the frame to connect the side plates and hold them in place.

We do not claim or intend to cover by our claims herein a shield or guard placed over a rotary shaft or roller to keep dirt or other material from falling thereon and not adapted to have the action of our shaft-clearer, as set forth by us.

Having thus described our invention, what we claim is—

1. In a lawn-mower, the main frame, including all the parts for holding the side plates in place, made in one piece and carrying the stationary cutter, in combination with the side plates, and adjustable connections between such plates and the frame, whereby the frame sides and plates are firmly fastened together, substantially as and for the purpose specified.

2. In combination with the side plates, the revolving cutter and the shaft thereof supported from the side plates, the main frame, including all the frame parts for joining and holding the plates, the cutter on the frame, and adjustable connections between the side plates and frame, adapted to connect the plates and frame sides firmly together, while allowing the frame to be adjusted to regulate the position of the cutter thereon with relation to the revolving cutter, substantially as and for the purpose shown.

3. In combination with the two side plates and the main frame for connecting them, pivoted to the plates, bolts for connecting the plates with the frame sides, passing through enlarged holes in such sides, and other bolts extending from the frame sides out through slots in the side plates, substantially as and for the purpose specified.

4. In combination with the side plates, the rotary cutter, and the shaft thereof, journaled on the side plates, the main frame consisting of the front and rear bars and the two side bars rigidly connecting the ends of the other bars, pivotal connections between the side bars and the side plates, and bolt-and-slot connections between the side bars and plates, adapted to fasten the side bars to the respective side plates, while allowing adjustment of the main frame on its pivots and the stationary cutter on the frame, substantially as and for the purpose shown.

5. In combination with the side plates and the main frame, consisting of the front and rear and the two side bars rigidly connected together, pivotal connections between the side bars and side plates, bolts on the side bars at points between the ends of such bars engaging slots in the side plates, nuts on said bolts, the rotary cutter having its shaft journaled in the side plates, and the stationary cutter carried by the frame, substantially as and for the purpose set forth.

6. In combination with the side plates and the main frame, consisting of the forward and rear bars and the two side bars rigidly connected with the other bars, pivoted connections between the side bars of the frame and the side plates, bolt-and-slot connections connecting each side bar at two points with the side plates, so that the frame can be adjusted on its pivot and fixed at any adjustment, the stationary cutter on the frame, and the rotary cutter having its shaft journaled on the side plates, substantially as and for the purpose described.

7. In combination with the side plates and the frame, screws tapped through portions of the side plates and oppositely-inclined bearing-surfaces on opposite sides of the frame engaged by the screw, substantially as and for the purpose specified.

8. In combination with the side plates and the frame, screws tapped through portions of the opposite sides of the frame and a bearing-surface on each side plate, such bearing-surfaces being inclined in opposite directions and engaged by the screws on the frame sides, substantially as and for the purpose shown.

9. In combination with the side plates and the cutter-carrying frame, adjusting-screws on the side plates and the cutter-carrying frame and inclined bearing-surfaces on the frame and the side plates respectively engaged by the screws, so as to hold the frame sides and side plates together, the bearing-surface on each plate being inclined in the same direction as the adjoining bearing-surface on the frame, substantially as and for the purpose set forth.

10. In combination with the cutter-carrying frame and the side plates, inwardly-inclined bearing-surfaces on the frame and plates, the adjusting-screws on the side plates engaging the inwardly-inclined surfaces on the frame, and the screws on the frame engaging the inwardly-inclined bearing-surfaces on the side plates, substantially as and for the purpose described.

11. In combination with the side plates and the main frame pivoted thereto, bolt-and-slot connections between the frame and the plates to allow relative adjustment of the same on their pivotal connections, set-screws on the side plates and frame sides, and inwardly-inclined bearing-surfaces on the plates and frame sides engaged by the screws on the frame sides and plates, respectively, substantially as and for the purpose specified.

12. In a lawn-mower, in combination with the frame carrying the cutter, the revolving cutter, and the side plates carrying the revolving cutter-shaft and attached to the frame sides by attachment allowing of adjustment of the frame to raise and lower the cutter thereon, screws tapped down through portions of the side plates, inclined bearing-surfaces on the frame sides engaged by such screws, screws tapped down through portions of the frame sides, and bearing-surfaces on the side plates inclined in the same direction as the bearing-surfaces on the frame sides and engaged by the screws on such side, substantially as and for the purpose shown.

13. In combination with the rotary shaft and the journal-bearing therefor, a clearer in contact with a portion only of the shaft's circumference and engaging the shaft-surface next to the bearing, substantially as and for the purpose specified.

14. In combination with the rotary shaft and the journal-bearing therefor, the clearer consisting of a projection on the bearing in contact with a portion only of the shaft's circumference and engaging the shaft-surface from the bearing outward, substantially as and for the purpose shown.

15. As a means for preventing the collection of grass and dirt on the cutter-shaft of a lawn-mower near its bearing, in combination with the cutter-shaft and the journal-bearing therefor, the shaft-clearer consisting of a stationary piece situated at one side of the bearing and concaved to fit the shaft closely and of such size as to extend only partly around the same, substantially as and for the purpose specified.

In testimony that we claim the foregoing we have hereunto set our hands this 25th day of January, 1888.

HENRY H. DILLE.
ELWOOD W. McGUIRE.

Witnesses:
LIZZIE JONES,
SARAH E. MENDENHALL.